United States Patent [19]

Trani

[11] Patent Number: 5,052,932

[45] Date of Patent: Oct. 1, 1991

[54] SPHERICAL SIMULATOR

[76] Inventor: James Trani, 10842 Langmuir Ave., Sunland, Calif. 91040

[21] Appl. No.: 469,232

[22] Filed: Jan. 24, 1990

[51] Int. Cl.⁵ .................................... G09B 9/00
[52] U.S. Cl. .................................... 434/29; 272/33 R
[58] Field of Search .................. 272/33; 434/29, 34, 434/40, 55, 46

[56] References Cited

U.S. PATENT DOCUMENTS

| | | | |
|---|---|---|---|
| 3,718,909 | 3/1973 | McKnight | 434/40 |
| 3,732,630 | 5/1973 | Crosbie et al. | 434/42 |
| 4,455,962 | 6/1984 | Gongwer | 244/234 X |
| 4,514,347 | 4/1985 | Reed | 434/40 X |
| 4,710,128 | 12/1987 | Wachsmuth et al. | 434/46 |
| 4,856,771 | 8/1989 | Nelson et al. | 434/34 X |

*Primary Examiner*—Richard J. Apley
*Assistant Examiner*—Glenn E. Richman
*Attorney, Agent, or Firm*—Michael I. Kroll

[57] ABSTRACT

A spherical simulator is disclosed and includes a rotational sphere needing power to rotate, and containing a wall, a center, a center axis, a spherical compartment, a base assembly for supporting the sphere, and rotational propulsion assemblies for transferring the power from the base assembly to the sphere.

12 Claims, 3 Drawing Sheets

SPHERICAL SIMULATOR

BACKGROUND OF THE INVENTION

1. Field of the Invention

The present invention relates to a simulator.

More particularly, the present invention relates to a simulator that provides a full range of gravity sensations from zero gravity free fall to the restraining force of a rocket launching.

2. Description of the Prior Art

Numerous innovations for simulators have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provide a spherical simulator which avoids the disadvantages of the prior art.

More particularly, the spherical simulator of the present invention is the first truly complete simulated experience. The spherical simulator is literally what the name implies. It is a twelve foot in diameter sphere which has the capability of full rotational control along two axis. It is designed to hold four passengers during each ride experience and provides complete visual, audio and gravity sensations. The feature which makes this simulator unique is its ability to provide the full range of gravity sensations from zero gravity free fall to the restraining force of a rocket launching. In addition, it is modular. Depending upon the individual needs of each user either an individual simulator can be installed or a field of simulators can be installed, providing the equivalent capacity of a full scale attraction. The simulators can be distributed with each having its own show. What makes this simulator design even more flexible is its low cost for a single simulator module. An individual module is well within the price range of any user.

In keeping with these objects, and with others which will become apparent hereinafter, one feature of the present invention resides, briefly stated, in a simulator having a rotational sphere acquiring power to rotate, and containing a wall, a center, a center axis, a spherical compartment, a base assembly for supporting the sphere, and rotational propulsion assemblies for transferring the power from the base assembly to the sphere.

In accordance with another feature of the present invention, the sphere compartment is divided into a first internal area and a second internal area.

Another feature of the present invention is that the first internal area is a guest area containing a pair of bench seats which can each support a pair of guests.

Yet another feature of the present invention is that the wall of the sphere contains a door so that the guest enters the guest area directly from the outside.

Still another feature of the present invention is that the pair of bench seats face the center of the sphere.

Yet still another feature of the present invention is that it further comprises a pair of full height rear projection viewing screens, and a speaker system.

Still yet another feature of the present invention is that the second internal area contains a pair of projectors, audio support equipment, and a sphere balancing assembly.

Another feature of the present invention is that each of the pair of projectors project an image onto each of the pair of full height rear projection viewing screens and which are disposed oppositely to each of the pair of bench seats, respectively.

Yet another feature of the present invention is that the image is synchronized with the movement of the sphere and the sound of the speaker system.

Still another feature of the present invention is that the sphere balancing assembly includes a dead weight adjustable along a track and being mounted vertically along the inside face of the sphere so that feedback from a load cell that is mounted in the base of the sphere automatically moves the track to maintain a center of gravity along the center axis of the sphere.

Yet still another feature of the present invention is that the rotational propulsion assemblies permit the sphere to rotate along a first axis and a second axis.

Still yet another feature of the present invention is that it further comprises a sphere pedestal permits the sphere to rotate along the two axis.

Another feature of the present invention is that it further comprises linear induction motors for propulsion about the first axis.

Yet another feature of the present invention is that the linear induction motors are contained in cantilevered supports.

Still another feature of the present invention is that it further comprises additional linear induction motors for propulsion of the second axis, and the base containing linear induction motors for propulsion of the second axis.

Yet still another feature of the present invention is that the base assembly contains motor variable frequency drives, power supplies, computer controls, and support beam load bearings.

Still yet another feature of the present invention is that the sphere and the base assembly are constructed of a steel frame with molded plastic walls.

Another feature of the present invention is that the inside face of the sphere is changeably decorated to resemble the specific simulation provided.

Yet another feature of the present invention is that the sphere requires on site a 100 kVA electrical power source or a 75 kW generator, in order to operate.

Still another feature of the present invention is that the user is exposed to various G-forces to simulate different maneuvers.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 1A is a cross sectional view taken along line CC in FIG. 1;

LIST OF REFERENCE NUMERALS UTILIZED IN THE DRAWING

Figure 1:
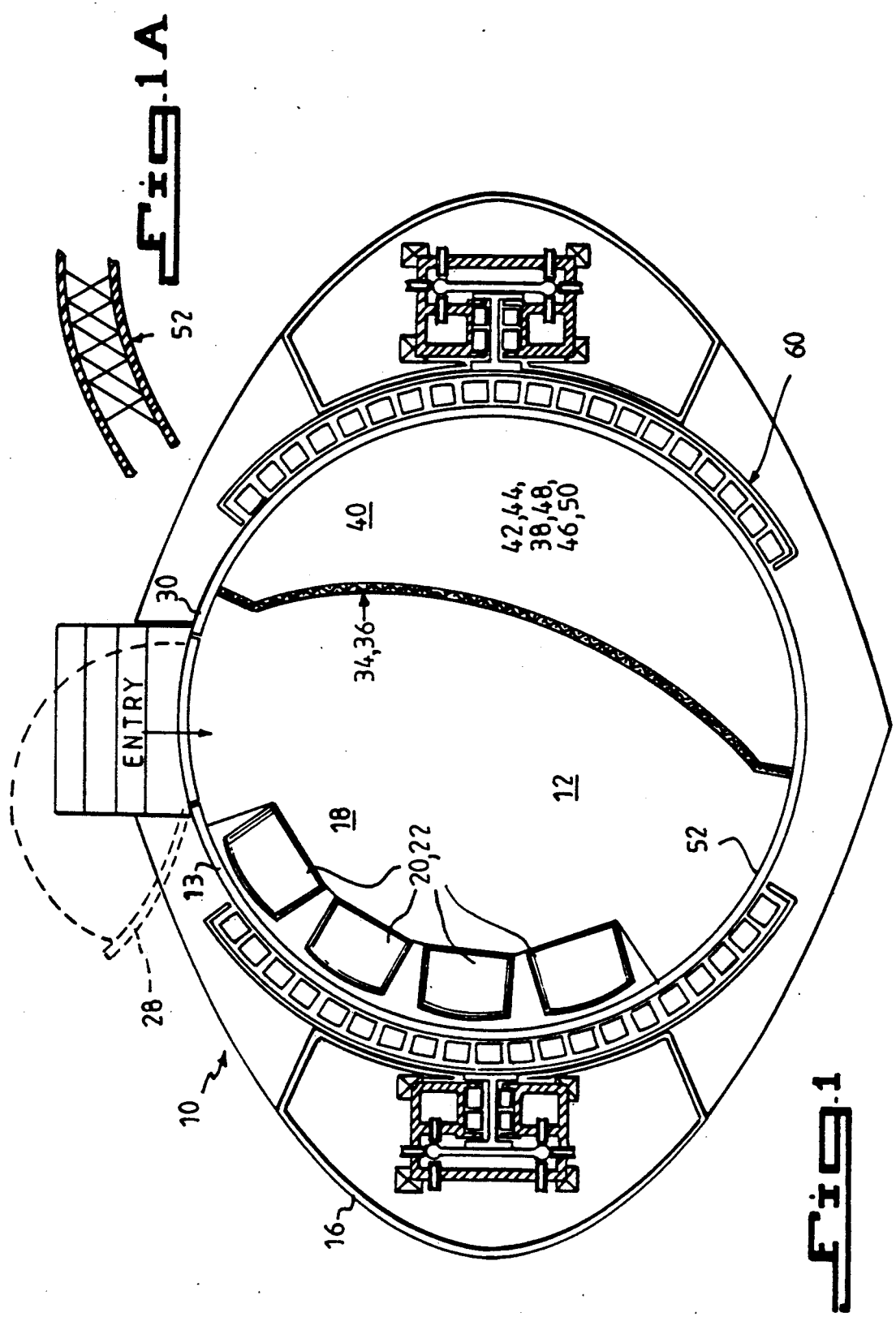
FIG. 1 is a plan view of the interior of the spherical simulator of the present invention.
Figure 2:
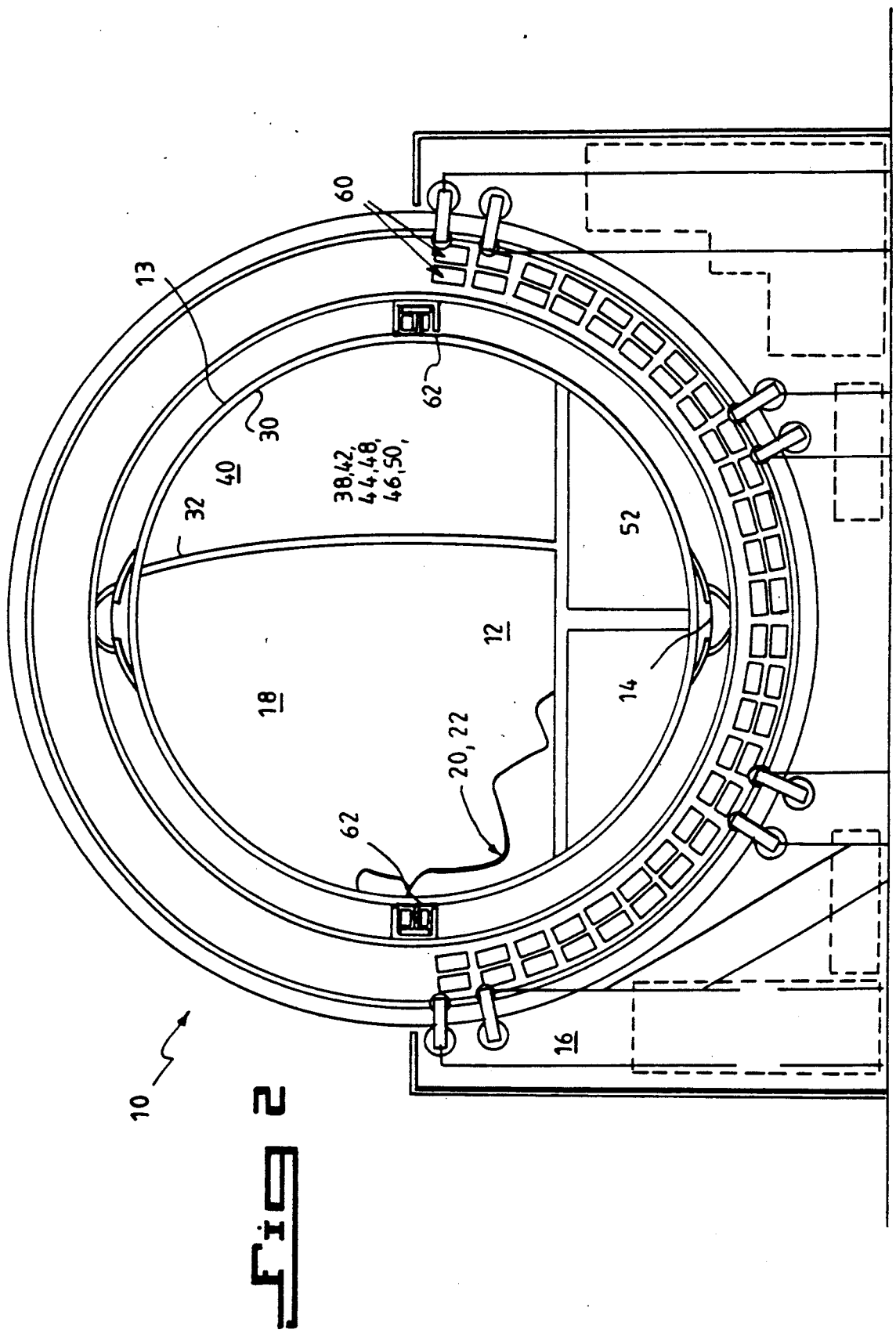
FIG. 2 is a cross sectional view taken along line AA in FIG. 1.
Figure 3:
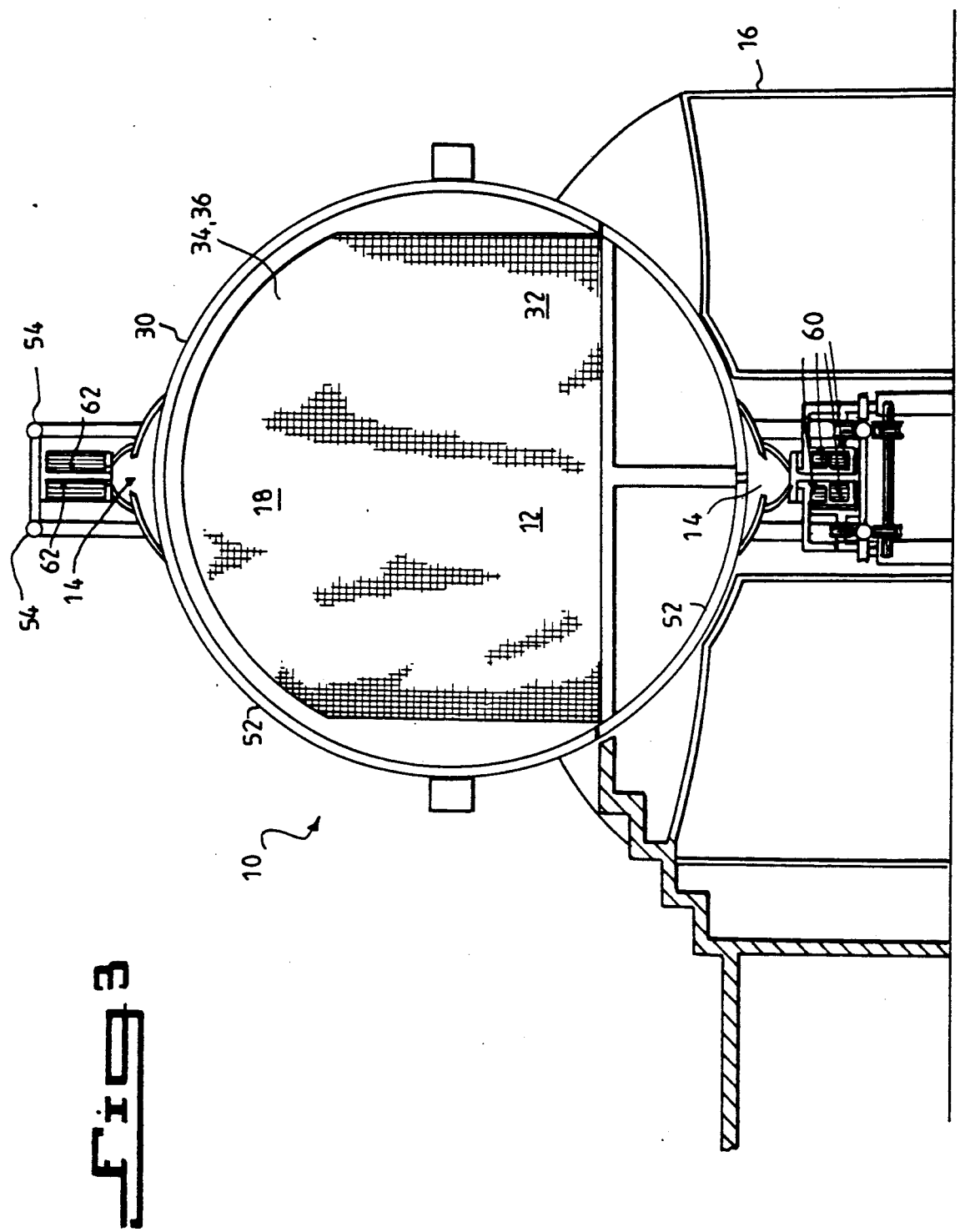
FIG. 3 is a cross sectional view taken along line BB in FIG. 1.

10—spherical simulator
12—sphere compartment
13—sphere
14—rotational propulsion assemblies
16—base assembly
18—guest area
20—first bench seat
22—second bench seat
28—door in the wall 30
30—wall
32—full height demising wall
34—first full height rear projection viewing screen
36—second full height rear projection viewing screen
38—speaker system
40—second compartment
42—first projector contained in the second compartment 40
44—audio support equipment in the second compartment 40
46—sphere balancing assembly
48—second projector contained in the second compartment 40
50—dead weight of the sphere balancing assembly 46
52—inside face of the sphere 13
53—load cell
54—track
58—sphere pedestal
60—linear induction motors
62—platten assembly

DETAILED DESCRIPTION OF THE PREFERRED EMBODIMENT

Referring now to the FIGURES, in which like numbers indicate like parts, the spherical simulator of the present invention is shown generally at 10 and is composed of the sphere compartment 12, the rotational propulsion assemblies 14, and the base assembly 16.

The sphere compartment 12 is twelve feet in diameter and is subdivided into two areas. The guest area 18 occupies less than half the sphere 13 and consists of two specially designed bench seats 20, 22, which can each support two ride participants 24, 26.

The ride participant enters into the area 18 directly from the exterior through a door 28 in the wall 30 of the sphere 13. Both bench seats 20, 22 face toward the center of the sphere 13, and a full height demising wall 32, which consists of two full height rear projection viewing screens 34, 36, and the speaker system 38. Behind the demising wall 32 is the second compartment 40, which contains the projectors 42, 48, the audio support equipment 44, and the sphere balancing assembly 46.

The two projectors 42, 48 are required, each projecting an image on the demising wall 32 screen opposite one of the bench seats 20, 22. Each viewing image is six feet wide by six feet high. The projection show is synchronized with the movement of the sphere 13 and the speaker system 38.

The sphere balancing assembly consists of a dead weight 50, adjustable along a track 54, mounted vertically along the inside face 52 of the sphere 13. Based on feedback from a load cell 53 mounted within the base assembly 16 of the sphere 13, the dead weight 50 automatically moves along the track 54 to maintain a center of gravity along the center of axis of the sphere 13.

The rotational propulsion assembly 14 gives the sphere 13 the ability to rotate along two axis. The design of the sphere pedestal 18 allows for these two degrees of freedom. The first axis is in the full vertical position at the beginning of the simulation. Rotation along this axis provides the centripetal force required to establish a slight force on the guests body against the back of the bench seat 20, 22. It also provides the body force effects of turning during the simulation.

Along this axis the sphere 13 rotates at a base speed of twenty four revolutions per minute. At this speed the guest are held in place against the back of their seat 20, 22 regardless of the spherical position. To simulate a turn, the rotational speed is slightly increased to simulate a left turn and slightly decreased to simulate a right turn.

Propulsion for this axis is achieved by linear induction motors 60 mounted on cantilevered supports halfway up both sides of the sphere 13. Each support contains linear induction motors 60 so that a total centrifugal acceleration force of 800 pounds can be provided. The linear induction motors 60 interact with a platten assembly 62 which consists of a copper and steel band eighteen inches wide and located around the equator of the sphere 13. The motor supports are mounted to a sphere support beam which fully encircles the sphere 13 and provides the points of support for the sphere support column.

The second axis is in the full horizontal position at the beginning of the simulation. Rotation along this axis provides the simulation of either rising or falling. Whereas the first axis sees a relatively constant rotational speed, this axis sees only pulses and partial movements.

To accomplish zero gravity the axis pulses clockwise while the guests are in the lower hemisphere of rotation and stops while they are in the upper hemisphere (upside down). To accomplish the simulation of rising, the axis rotates in the counterclockwise direction while the guest is in the lower hemisphere rotation and clockwise while the guest is in the upper hemisphere of rotation. Propulsion for the axis is achieved by linear induction motors 60 mounted in the sphere support base. These motors 60 are mounted along both sides of the sphere support beam as it passe through the support base. Not only does the support beam hold the sphere 13 up through the support base, it acts as the platten 62 for the second axis of rotation and the commutator assembly for the powering of the first axis linear induction motors 60. Motors 60 are mounted in the sphere base on each side of the support beam, to facilitate rotation along the second axis.

The support base holds the sphere 13 upright. It has a footprint of approximately fourteen feet by fourteen feet. In addition to housing the linear induction motors 60 for the second axis of rotation, it also contains the motor variable frequency drives, power supplies, computer controls, and support beam load bearings.

Both the sphere 13 and the support base are constructed of a steel frame with moulded plastic walls, but it is not limited to it. The interior 52 of the sphere 13 is decorated to resemble the specific simulation which can be changed, when desired.

On site support requirement for the sphere 13 is a 100 kVA electrical power source or a 75 kW generator.

Recent NASA research has proven that an individual cannot perceive that they are spinning or become nauseous when they are enclosed within an environment in which they cannot see stationary objects. This is the primary theory behind the operation of the simulator 10 of the present invention.

In operation, the individual enters the sphere 13 through the door 28 and sits on one of the two benches 20, 22. In front of him is a six foot square viewing screen 34, 36 while the rest of the compartment 18 resembles an aircraft or vehicle cockpit. He can see the other three guest in the sphere 13. With the guests in their safety harnesses, the ride operator closes and secures the door 28. The guests now have no perception of the outside world. There are no windows in the sphere 13.

As the guest becomes comfortable the viewing screen 32, 34 is activated and the guests are briefed on their upcoming adventure. As they are being briefed the axis of rotation is initiated and they are accelerated to a constant rotational velocity of twenty four revolutions per minute, within nine seconds. This acceleration is not noticeable to the guest except for a slight increase in their body pressure against the back of the seat 20, 22.

The seat 20, 22 is designed so that its back has a slight curvature with the focal point of that curvature being placed along the equator of the sphere 13. The seat 20, 22 is designed so that the average guest heart is placed along the focal point of the curvature.

Based on the story that is being shown on the viewing screen 32, 34, the guest undergoes a series of experiences which have no limitations with respect to the forces simulated onto the guest. When they enter the zero gravity portion of the experience they notice that they are sliding up their seat 20, 22. When they are experiencing the sensation of being launched at tremendous accelerations, they notice that they are being pushed down into their seats 20, 22. Throughout this experience the sound system 38 provides supporting audio sensations. The attraction can range from a deep space exploration experience to a roller coaster ride. It is only limited by the imagination of the operation.

With the ride experience approaching the end, the sphere 13 returns to its original position and comes to a stop along its first axis of rotation. The guest departs from the simulator 10 of the present invention and may immediately board another simulator 10 with a different ride experience. They may also choose to watch the simulator 10 of the present invention operate from the outside, where it appears as a beautiful spinning ball on a pedestal. With a field of simulators 10 of the present invention there are no limitation to the light experiences that can be provided to the guests while they watch the ride operate.

It will be understood that each of the elements described above, or two or more together, may also find a useful application in other types of constructions differing from the type described above.

While the invention has been illustrated and described as embodied in a simulator, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A modular relatively portable spherical simulator, comprising:
   a) a modular rotational sphere containing a wall, with an inside face, a center, a center of gravity, a center axis, and a spherical compartment, said wall of said sphere containing a door allowing the guests direct access to said guest area directly from the outside without having to climb into a cockpit;
   b) modular base assembly for supporting said sphere and containing a load cell for producing feedback;
   c) means void of a centrifuge for providing a full range of gravitational sensations starting from zero gravity free fall weightlessness to the restraining force of a rocket launching so that said user is exposed to various G-forces to simulate different maneuvers;
   d) a pair of full height rear projection viewing screens and a speaker system;
   e) rotational propulsion assemblies permitting said sphere to rotate along a first axis and a second axis by transferring power from said base to said sphere;
   f) a sphere pedestal, said sphere pedestal permitting said sphere to rotate along said two axis;
   g) linear induction motors for propulsion about said first axis;
   h) cantilevered supports for holding said linear induction motors used for propulsion of said first axis; and
   i) additional linear induction motors for propulsion of said second axis, said base containing said linear induction motors for propulsion of said second axis.

2. A simulator as defined in claim 1, wherein said sphere compartment is divided into a first internal area and a second internal area.

3. A simulator as defined in claim 2, wherein said first internal area is a guest area containing a pair of bench seats which can each support a pair of guests.

4. A simulator as defined in claim 3, wherein said pair of bench seats face said center of said sphere.

5. A simulator as defined in claim 4, wherein said second internal area contains a pair of projectors, audio support equipment, and a sphere balancing assembly.

6. A simulator as defined in claim 5, wherein each of said pair of projectors project an image onto each of said pair of full height rear projection viewing screens which are disposed oppositely to each of said pair of bench seats, respectively.

7. A simulator as defined in claim 6, wherein said image is synchronized with the movement of said sphere and the sound of said speaker system.

8. A simulator as defined in claim 7, wherein said sphere balancing assembly includes a dead weight adjustable along a track and being mounted vertically along said inside face of said wall of said sphere so that said feedback from said load cell that is mounted in said base of said sphere automatically moves along said track to maintain said center of gravity along said center axis of said sphere.

9. A simulator as defined in claim 8, wherein said base assembly contains motor variable frequency drives, power supplies, computer controls, and support beam load bearings.

10. A simulator as defined in claim 9, wherein said sphere and said base assembly are constructed of a steel frame with molded plastic walls.

11. A simulator as defined in claim 10, wherein said inside face of said sphere is changeably decorated to resemble the specific simulation provided.

12. A simulator as defined in claim 11, wherein said sphere requires on site a 100 kVA electrical power source or a 75 kW generator, in order to operate.

* * * * *